United States Patent [19]

Schorsch et al.

[11] 4,071,898
[45] Jan. 31, 1978

[54] SHIP PERFORMANCE ANALYZER

[75] Inventors: Eugene Schorsch, Springfield, Pa.; Spurgen Sutherland, Clifton, N.J.

[73] Assignee: Sun Shipbuilding & Dry Dock Company, Chester, Pa.

[21] Appl. No.: 696,103

[22] Filed: June 14, 1976

[51] Int. Cl.² .................. G01L 25/00; G01S 5/02
[52] U.S. Cl. .................. 364/551; 343/112 S; 364/424; 364/452; 364/565
[58] Field of Search .......... 235/150.2, 150.27, 151.3; 343/103, 112 S; 73/178, 181

[56] References Cited

U.S. PATENT DOCUMENTS

| 3,855,456 | 12/1974 | Summers et al. | 235/151.3 |
| 3,881,096 | 4/1975 | Schmidt | 343/103 |
| 3,906,437 | 9/1975 | Brandwein et al. | 235/150.2 |
| 3,941,984 | 2/1976 | Chappell et al. | 343/103 |
| 4,024,383 | 5/1977 | Beasley | 235/150.27 |

Primary Examiner—Felix D. Gruber
Attorney, Agent, or Firm—J. Edward Hess; Donald R. Johnson; James H. Phillips

[57] ABSTRACT

A system designed to periodically obtain a precise measure of the impact of all factors which may be degrading a ship's operational performance. A complete trial of a ship consists of several test runs of the ship in opposite directions during which the propulsion plant shaft horsepower is maintained steady. If the net drift during the relatively short period of the trial is constant then test runs in opposite directions cancel the effects of current and wind on that trial. By combining the results of runs on reciprocal headings, ship speed through the water is obtained to builder trial accuracy. During a run, the system acquires data from the ship's gyrocompass, a torsionmeter which is mounted on the propeller shaft, a fuel flow meter, a fuel line thermocouple and the ship's Loran receivers. The system processes time difference readings from the Loran receivers to obtain ground speed. The processing capability is such that ground speed may be determined from the Loran signals with the ship running in any direction, unlike the prior art wherein run directions were constrained. Propeller shaft horsepower and speed of the shaft in revolutions per minute are obtained from the ship's torsionmeter. The system calculates ship speed over the earth's surface, and determines fuel flow in pounds per shaft horsepower.

12 Claims, 6 Drawing Figures

SHIP PERFORMANCE ANALYZER

BACKGROUND OF THE INVENTION

The present invention relates generally to a system for analyzing the operational performance of a ship. Accurate knowledge of three measured quantities is necessary to analyze the performance of a ship at any point in its lifetime. These quantities are ship speed, propulsion shaft torque and the revolving speed of the shaft. The product of torque and revolving speed is known as the shaft horsepower. Typically, the ship is designed to achieve a certain speed through the water at a certain shaft torque and speed in revolutions per minute (RPM). These quantities are measured during a trial trip of a newly built vessel to demonstrate that performance objectives have been met before the vessel is delivered to its owner. In practice, the results are usually expressed as speed in knots, shaft horsepower, and RPM.

During the life of the ship, changes may occur which affect the performance as measured by these three quantities. The three quantities are, in general, functions of each other and a change in one will result in a change in at least one of the others. The following are three possible changes in performance:

a. Ship speed and RPM both decrease at the same horsepower. This is caused by an increase in ship resistance.

b. Ship speed decreases and RPM increases at the same horsepower. This is caused by damage to the propeller.

c. Ship speed decreases, RPM decreases, and horsepower also decreases. This is caused by a malfunction of the power plant.

Measurement of the shaft speed in revolutions per minute by means of a shaft revolution counter is commonplace and available on virtually all vessels.

Measurement of shaft horsepower accurately is seldom found on vessels in normal commercial service except during the trial trip at which time the builder installs a special testing instrument for this purpose, that instrument being removed after the trial trip. In recent years advances have been made in propulsion shaft torsionmeters, and also it is not now uncommon for such devices to remain onboard after the trial trip.

The most difficult of the three parameters to measure accurately is the ship speed, primarily because deep water is necessary to avoid shallow water effects upon speed and there is typically a lack of a good physical sighting reference in deep water. Several years ago a method of speed measurement was developed using the Loran system, a radio aid to navigation. This method of speed measurement utilizes successive position fixes, and has been successfully used for trial speed measurement on several occasions. The heart of the method depends upon the errors in Loran being of a random nature, and hence their effects subject to treatment by the use of statistical mathematics.

Loran is a hyperbolic navigation system which is based on the fact that the transmission time of a radio pulse traveling a certain distance is a measure of that distance. A pulse travels 983.24 feet or 0.16171 nautical miles in one microsecond (millionth of a second), and therefore measurements of time of receipt of signals can readily be converted into distances from transmitting stations.

A pair of Loran transmitting stations located several hundred miles apart emit pulses at certain intervals, and a navigator by means of a Loran receiving unit can measure the time difference in receipt of signals from the two stations. The Loran receiving unit is essentially an electronic stop watch which measures accurately in microseconds this time difference. In practice a "Master" transmitting station emits a signal which is received a fixed interval of time later at a "slave" station and which triggers, after a fixed time delay, a pulse from the slave station. The navigator aboard a ship or airplane in the area measures the time difference between his receipt of the "Master" signal and the "slave" signal. Since the time difference is a measure of distance, it follows that the vessel or airplane lies on a line of constant difference in distance from the two stations. These lines of constant time or distance difference are a family of hyperbolae with the stations as foci. A line of position may therefore be determined by a single reading utilizing one station pair, and a "fix" may be obtained by measuring the time difference in receipt of signals from a second pair of stations.

Loran lines are closest together on a base line between stations, and therefore most accurate measurements of speed or distance can be made by steaming on or close to a Loran base line and on a course such that the Loran hyperbolae are crossed at right angles.

In order to measure speed by the use of Loran, there are three factors which must be determined. The vessel's speed during a run must be obtained in microseconds per unit of time, the vessel's course over the ground must be determined, the conversion factor of microseconds to nautical miles in the area in which the run is made must be known. Each of these factors must be determined to an accuracy such that the product of the three will be of at least the required accuracy.

In order to limit the length of speed runs to a reasonable distance, it was recognized that the methods of statistical mathematics must be applied to a rather large number of Loran readings if the desired accuracy were to be attained. It has been demonstrated that the errors in Loran readings are random errors so that statistical techniques could be applied to attain the required accuracy. In particular, the Method of Least Squares has been used to eliminate the effects of the random errors in Loran readings.

One refinement which is not necessary to the method but which has greatly contributed to ease of application and rapidity of answer is the use of a computer ashore. After each run, the computer facility was contacted by radio phone and given the observed Loran data. Upon completion of the next run the answers for the first run complete with a statistical analysis and a check for random error validity were available on the phone.

One basic limitation to the use of Loran in the past has been the requirement that the ship run as perpendicular as possible to one set of Loran lines. This limitation was required to enable a reasonably accurate determination of the scale factor for converting Loran microsecond readings to nautical miles. The present invention relates to an improvement wherein the ship's speed may be calculated while the ship is running in any direction, thereby eliminating the prior art constraint that the ship run as perpendicular as possible to one set of Loran lines.

A complete test on a ship requires correction for the effects of currents and winds on the vessel. This has been accomplished by averaging the data for runs at substantially the same speed over the same course but in opposite directions. The ship is run first in one direction at a heading substantially perpendicular to a set of Loran lines, and set of readings are taken along that run. The ship then turns and proceeds back in the opposite direction over the same course during which time a second set of readings are taken. The ship then reverses course and proceeds over the same track (and in the said direction as the first run) during which time a third set of readings are taken. This completes the test. To average out the effects of winds and currents, the data from the second run is utilized twice, and averaged against the data for the first and third runs.

With this in mind, it may be seen that data may be taken while the ship is proceeding in any direction rather than compelling it to run perpendicular to Loran lines. The data for the first run may now be taken while the ship is on its normal commercial course. The ship then need only turn 180° for the second run, and once again to its original course during which the third set of readings is taken. A complete trial taken in this "heading independent" fashion, will result in a savings of up to several hours over the former method. When the hourly cost of running a ship is considered, it may be seen that a difference in several hours will result in substantial financial savings.

Further, an onboard permanent Ship Performance Analyzer enables the performance of the ship to be checked on a regular basis such that if there is a deterioration in performance, it may be readily detected and promptly corrected. Such an installation has the ability of performing a trial trip standardization at any time in the vessel's life without special manning or significant diversion from the vessel's commercial course. This should enable the ship during its life time to deliver the performance of which it is capable, and should result in the savings of substantial amounts of money, both in terms of a decrease in fuel used and an increase in cargo miles.

SUMMARY OF THE INVENTION

In accordance with a preferred embodiment, a system is disclosed for monitoring and analyzing the critical parameters of a ship's performance to provide an onboard assessment of that performance. The monitored parameters include the propeller shaft torque and speed, and the ship speed which is obtained by a novel approach using the Loran navigational system. Further, the system includes a printer for recording all measured critical parameters, such that the validity of a test run may be verified later.

In accordance with the disclosed embodiment, the ship speed is obtained by taking a plurality of received Loran navigational time difference readings during a run. The Loran readings are then statistically processed to eliminate random errors. In the preferred embodiment the statistical processing is accomplished by utilizing a least squares regression technique. The ship speed is calculated by determining expected values of a given physical parameter which is dependent upon Loran time difference readings at an assumed geographical location for the test run midpoint. The statistically processed Loran navigational signals are then utilized to calculate measured values of the same given physical parameter. The expected values of that physical parameter are then compared with the measured values to determine if they are within error tolerances. If they are, the assumed geographical location is taken as the test run midpoint, and velocity is calculated from the Loran data. If they are not, the location of the assumed geographical location is changed iteratively, new expected values of the given physical parameter are determined for the next iteration, and the comparison and iteration are repeated until the error tolerances are met.

DESCRIPTION OF A PREFERRED EMBODIMENT

Figure 1:
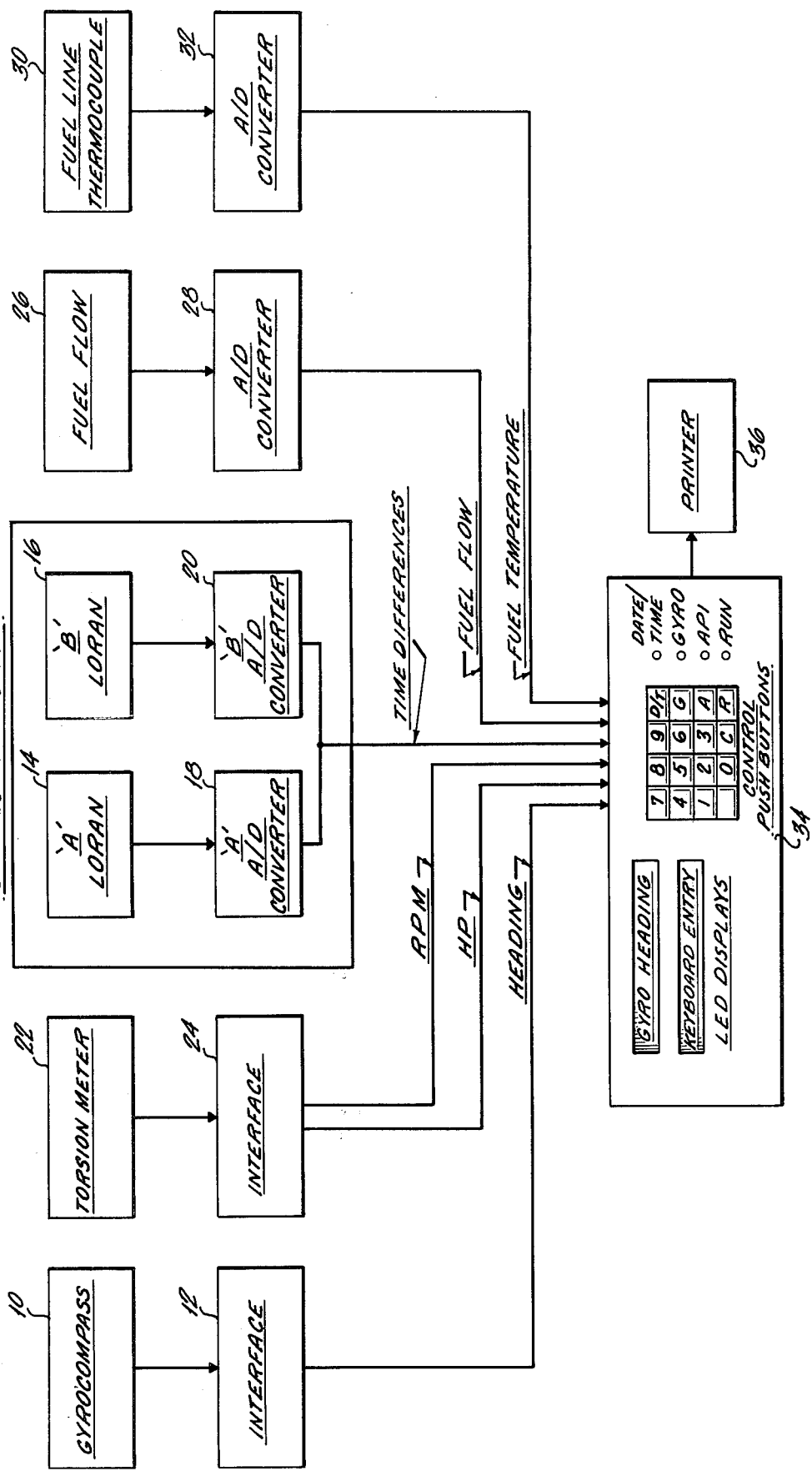
FIG. 1 illustrates a block diagram of the more important components of the present invention.

Referring to FIG. 1, there is illustrated a block diagram of the more important components of the present system. The ship's gyrocompass 10 presents an output which is a directional sensitive pulse train, such as may be obtained from a standard incremental electronic encoder. During a test run it is desirable to keep the ship on as steady a course as possible to minimize propulsion plant shaft horsepower variations, and accordingly a record of the gyrocompass reading presents a check on this. The pulse train from the gyrocompass is transmitted to a counting circuit 12 which increments or decrements a total pulse count from the gyrocompass in accordance with directional changes by the ship. Loran receiver A 14 and Loran receiver B 16 produce time difference signals, as is known in the art, and these time difference signals are digitized by A/D conversion circuits 18 and 20. A torsionmeter 22 is mounted on the ship's propeller shaft to measure the torque driving the propeller and also the rotational speed of the shaft. In the system shown in FIG. 1, the data is transmitted to an interface circuit 24. A fuel flowmeter 26 is mounted in the fuel line of the ship, and measures fuel flow during a test run. A fuel line thermocouple 30 measures the fuel temperature. A/D converters 28 and 32 digitize these last two readings for recording by a printer 36. During a test run of a ship, a processor 34 samples and records all of these readings on a regular basis.

The control panel for the analyzer is illustrated in FIG. 1, and contains light emitting diode, (LED), displays, control push buttons, and a ten key numeric display. Correction of an erroneous entry is afforded by a clear key. Control buttons, D/T for Date/Time, G for gyro, A for API gravity and R for Run are used to record required parameters. The sequence of operations described below may be controlled by a simple control circuit or program, as is known in the art.

A typical run will last approximately eight minutes, and a complete test trial will consist of three runs, the first and third in one direction, and the second in the opposite direction. Before a test run, the operator will note certain data for the run including the date, time, and API (American Petroleum Institute) gravity of the fuel. The operator will punch this data into the keyboard, and the printer will print it out on a printed paper tape record of the run.

In one designed embodiment, when the system is first turned on, the date/time LED flashes, signifying the beginning of a performance trial and that the system is enabled to accept the date. The date is entered into the keyboard buffer by depressing buttons on the numerical keyboard. The date will be displayed on the keyboard entry display. The data is stored by depressing the control button to the immediate left of the flashing LED. The date/time LED continues to flash, indicating that the time is to be entered via the keyboard and control button to the left of the flashing LED. The date/time LED is steadily illuminated and the gyro LED flashes. The current gyro heading is inserted into the keyboard display and stored via the control button to the immediate left of the flashing LED. The gyro heading is then transferred to the gyro display and from then on automatically updated as the heading changes. The gyro LED illuminates steadily, and the API gravity LED flashes. The API gravity is entered into the keyboard, and then stored via the control button to the immediate left of the flashing LED. The API gravity LED is then steadily illuminated and the RUN LED flashes. The control button to the immediate left of the flashing LED is depressed to start the run. During each run in each direction data is taken at time intervals $\Delta t$ of approximately six seconds from the Loran receivers, torsionmeter, gyrocompass counter, fuel flow meter, fuel line thermocouple, and a digital clock counter in the processor. The printer receives the data and prints out ten lines: the number $i$ of the sample (starting with $i = 1$), the "A" Loran time difference (TDA); the "B" Loran time difference (TDB); the elapsed time ($t$) from the beginning of the run at which TDA and TDB are taken, the RPM of the shaft; the HP of the shaft; the gyro heading; the fuel flow; and the fuel temperature. Circuits and other techniques for accomplishing these standard routines are well known in the art, and will not be explained in detail herein.

Figure 3:
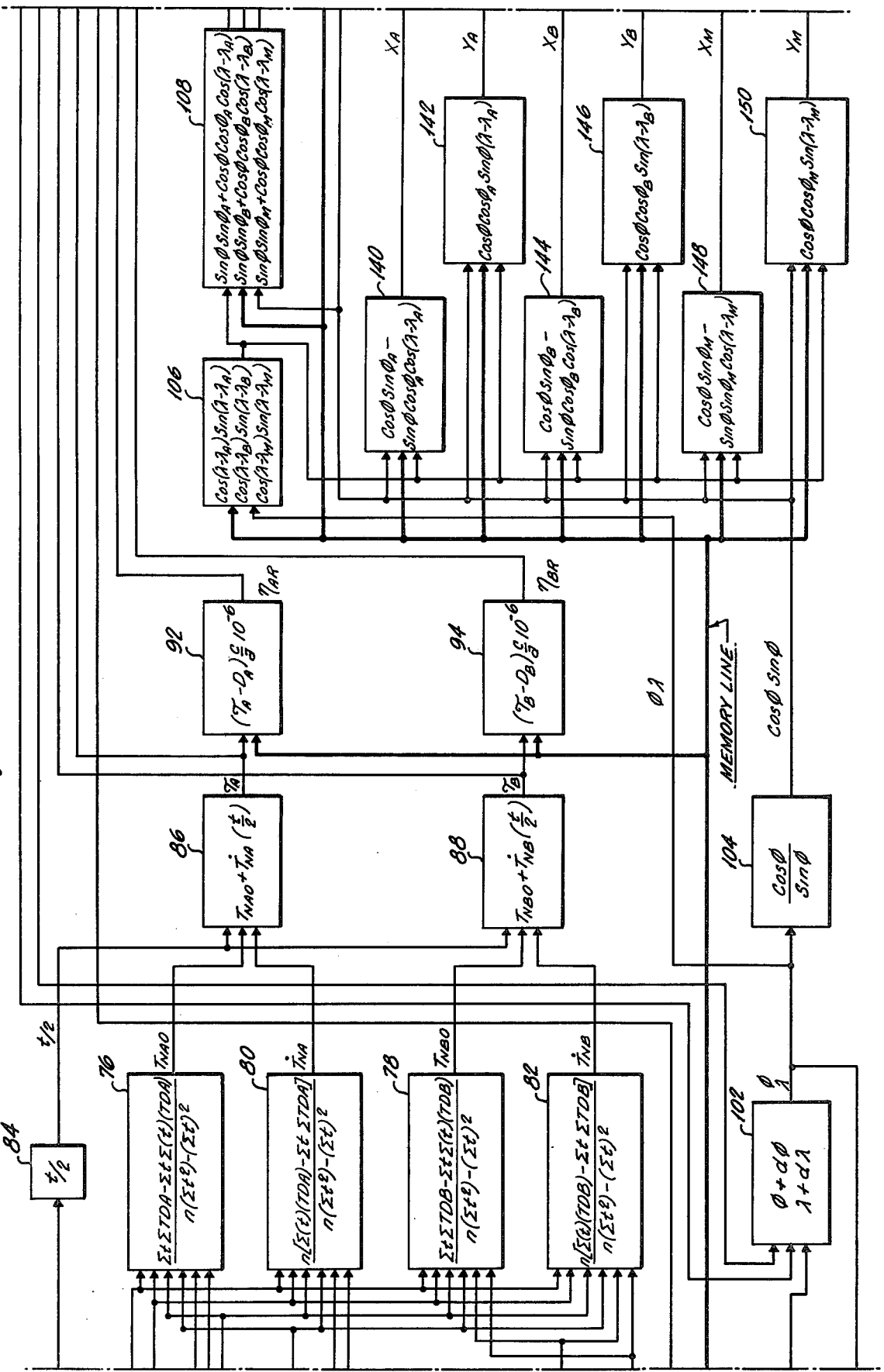
Figure 4:
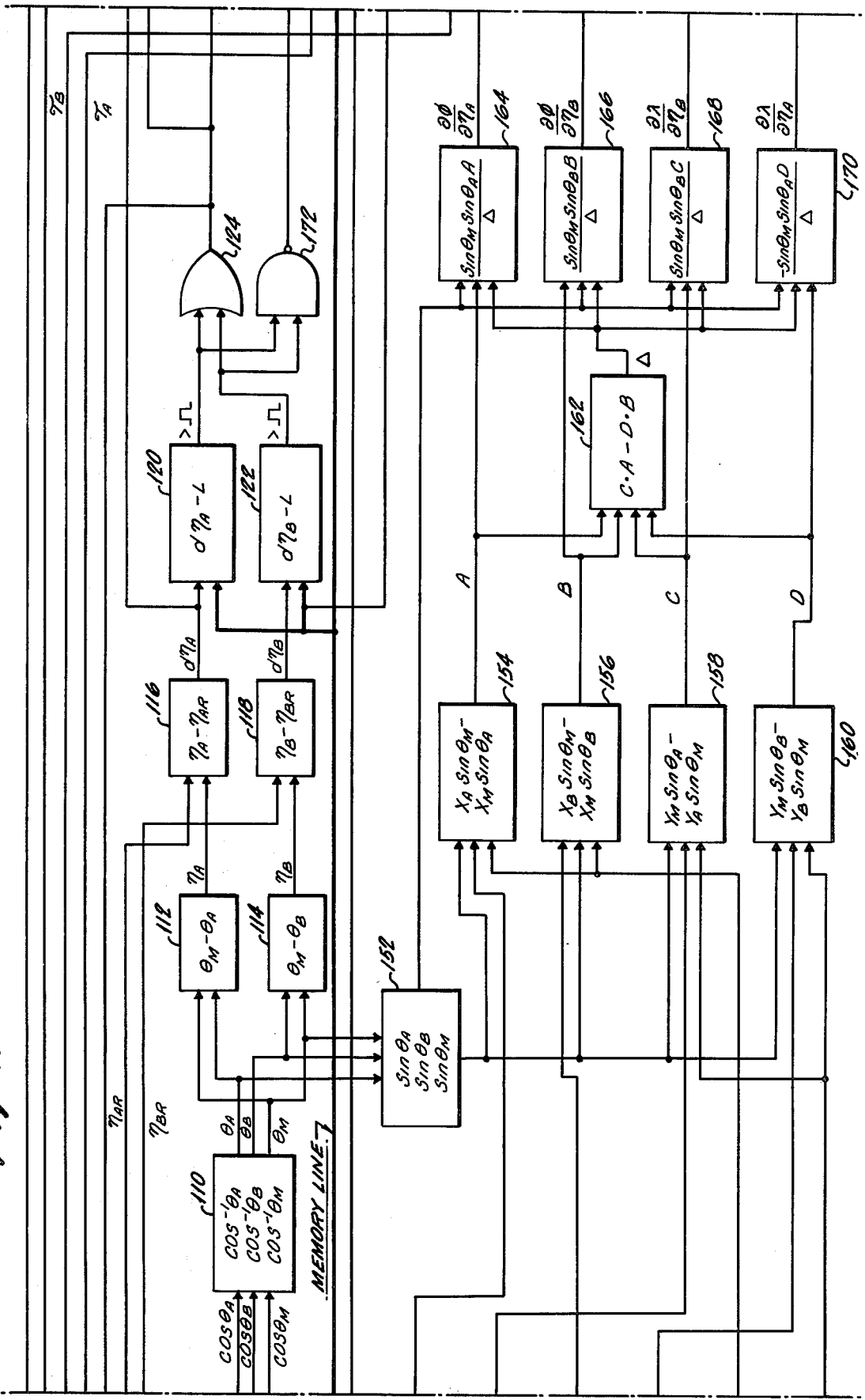
Figure 5:
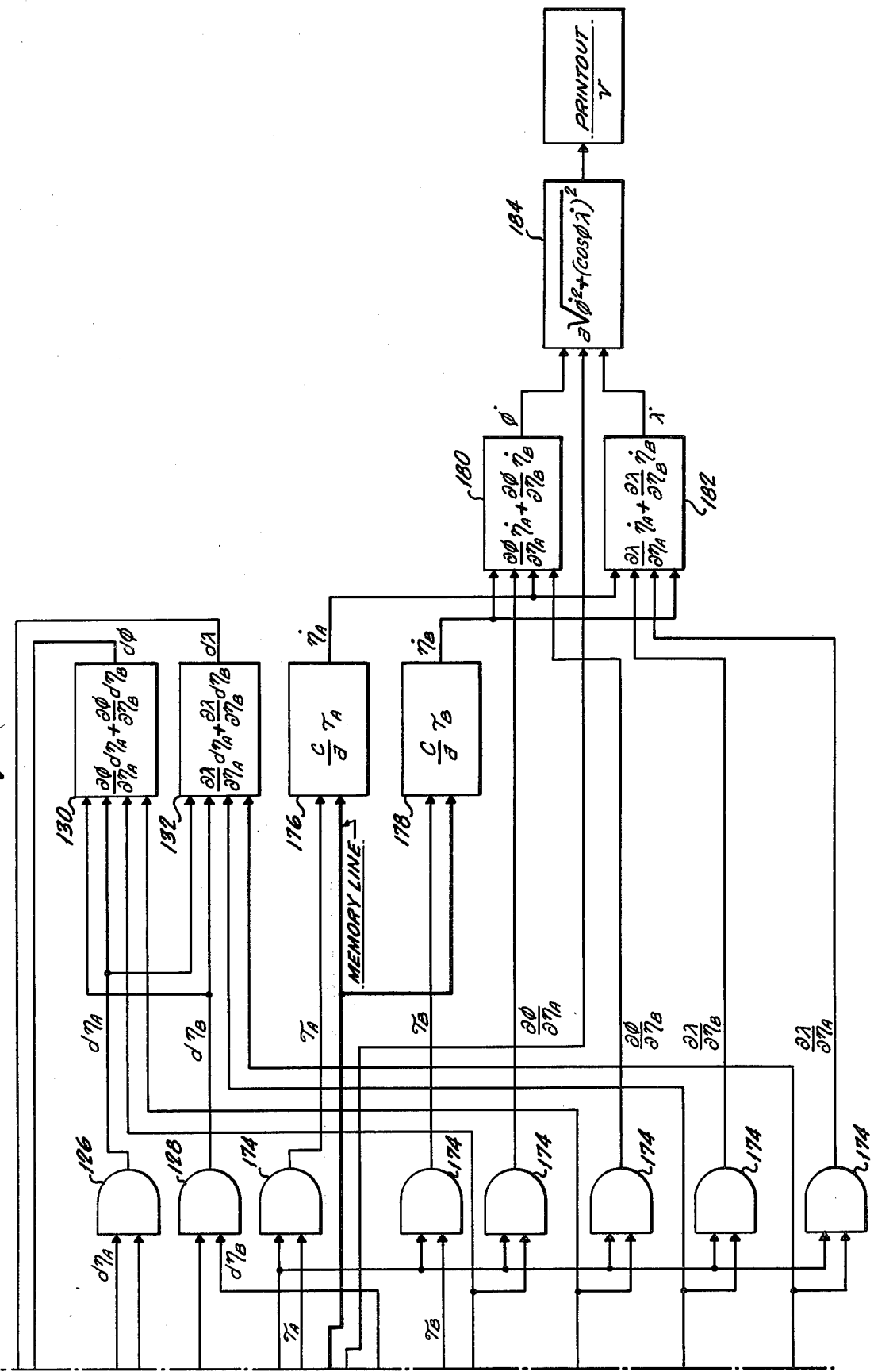

The required parameter which is the most difficult to measure accurately is the ship's speed. A processing circuit, such as that illustrated in FIGS. 2-5, receives the time difference readings from the two station pairs, master and "A" slave, and master and "B" slave approximately every six seconds during the run and calculates the ship's velocity. The following is a summary of the sequence of operations performed by the circuit of FIGS. 2-5. A detailed description is given later. Intermediate calculations (shown in top of FIG. 2) are made, and the results are stored for further use. The time difference readings from a Loran receiver include numerous sources of random error. For example, error caused by variations in atmospheric conditions is inherent in the transmission of Loran signals. The effects of random errors are eliminated by a statistical technique which fits a straight line to the data points using a least squares regression technique. After the run is completed, the least squares regression computation is made (left side of FIG. 3), and the resulting data is utilized to determine given physical parameters for the run, which in the illustrated embodiment are first $\tau_A$ and $\tau_B$ (FIG. 3), which are the calculated midpoints of the run in Loran readings from Loran stations A and B, and then $\eta_{AR}$ and $\eta_{BR}$ (FIG. 3), which for $\eta_{AR}$ is the difference of the arc length from the master Loran station to the midpoint calculated using a least squares technique and the arc length from the "A" Loran station to the same midpoint, and for which $\eta_{BR}$ is the corresponding difference of arcs for the B Loran station. An iterative technique is then utilized in which an initial geographical location for the midpoint of the run is assumed, and values $\eta_A$ and $\eta_B$ for the assumed midpoint are calculated (FIGS. 3 and 4). The values of $\eta_{AR}$ and $\eta_{BR}$ for the calculated midpoint are then compared with the values of $\eta_A$ and $\eta_B$ for the assumed midpoint, and the differences are tested against an error tolerance. If the tolerances are met, the assumed position (latitude and longitude) is used as the midrun location. If the tolerances are not met, corrections to the assumed position are made, and the process is repeated until tolerable values of $\eta_A$ and $\eta_B$ are obtained. Although the illustrated embodiment uses $\eta_A$ and $\eta_B$ for the computations in the iterations, other embodiments might use other given physical parameters, for instance the Loran time difference values for the run midpoint might also be utilized. The remainder of the computations are shown in FIG. 5. Using the midrun coordinates, the ship's speed is then calculated by determining the rate at which the Loran hyperbolae of each station are crossed. These rates are in turn used to calculate the speed at which the ship crosses latitude or longitude lines. After a correction is made for a difference in scale between latitude and longitude, the Pythagorean Theorem is then used to calculate the ship's speed. In the preferred embodiment, the results of this calculation should determine the ship speed to an accuracy of ±0.5 percent with Loran A type receivers, and ±0.25 percent for Loran C type receivers. After the computations for the run have been completed, the ship's speed obtained at the midpoint coordinates, the average HP, RPM, and fuel flow rate are printed. The printed paper tape output serves as a permanent record of the run, and provides extensive data for ongoing ship performance monitoring.

Figure 2:
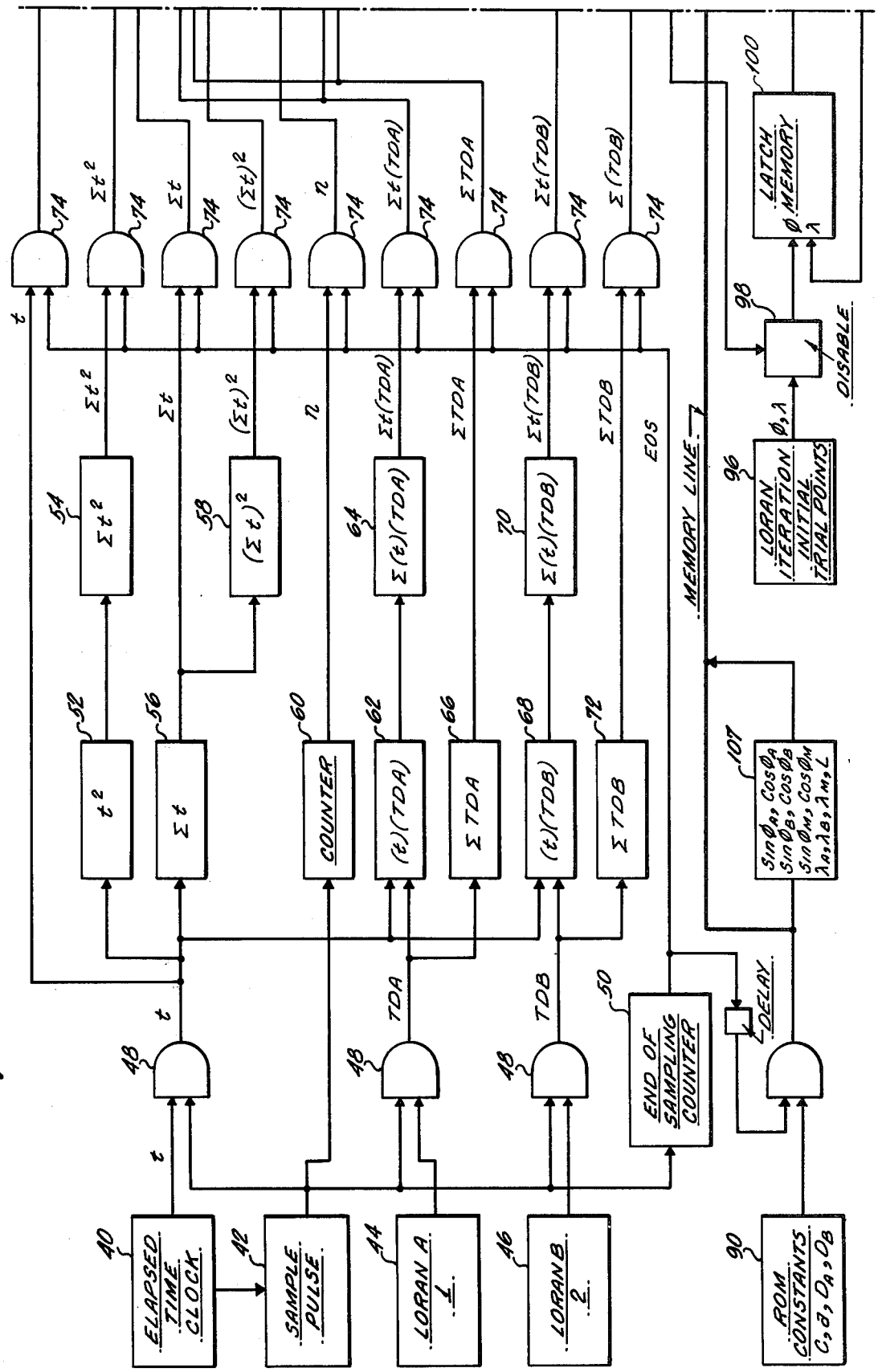
FIGS. 2, 3, 4 and 5 are different sections (which fit together) of a circuit for determining the ship's speed from received Loran navigational signals.

Referring more specifically to FIG. 2, the processor includes an elapsed time clock 40, which may be simply a digital clock, and the output of which is designated $t$. A sample pulse circuit 42 develops an output every 6 seconds during a trial run to cause a sampling of relevant parameters. A Loran receiver "A" 44 develops a Loran time difference signal between a master station and a first slave station (TDA), and Loran receiver "B" 46 develops a time difference signal between the master station and a second slave station (TDB). The elapsed time clock 40, Loran receiver "A" 44, and Loran receiver "B" 46 constantly have data at their outputs. This data is sampled every six seconds because sample pulses are directed by circuit 42 to AND gates 48. A counter 50 counts the number of sample pulses during a trial run, and when a predetermined number of samples has been taken, produces an output signal. Its function will be explained later. During the run, at each sampling a logic circuit 52 produces the value $t^2$, which is directed as an input to a further logic circuit 54 which sums the value $\Sigma t^2$. A logic circuit 56 calculates $\Sigma t$, and this output is directed to a logic circuit 58 which calculates $(\Sigma t)^2$. The sample pulses from circuit 42 are directed as an input to a logic circuit 60 which counts the number ($n$) of samples taken. A logic circuit 62 receives inputs every six seconds from clock 40 and the "A" Loran receiver, enabling calculation of the value ($t$) (TDA). The output of this circuit is directed to a further logic circuit 64 which calculates $\Sigma(t)$ (TDA). A logic circuit 66 receives input values every six seconds from the "A" Loran receiver to enable calculation of $\Sigma$TDA. Circuits 68, 70 and 72 are similar to circuits 62, 64 and 66 and perform the same calculations for the "B" Loran receiver signal (TDB).

All of the calculations performed thus far are intermediate calculations performed during a run. Each of the circuits updates its calculations every six seconds to take into account the most recent readings. At the end of a run, which consists of a predetermined number of samplings (in one designed embodiment, 80 samples), the circuit 50 produces an end of sample signal to cause all of AND gates 74 to pass the current values stored in each of the circuits 48, 54, 56, 58, 60, 64, 66, 70 and 72.

The values thus far accumulated are now statistically treated by utilizing a least squares regression technique to eliminate random errors. Utilizing this technique, logic circuit 76 combines the values at its input as shown to compute $T_{NAO}$, which represents the initial starting line of position (hyperbola) of the run as computed from the "A" Loran signals while utilizing the least squares regression technique to eliminate random errors. This signal is actually a Loran time difference, which represents a Loran line of position. Likewise a logic circuit 78 utilizes the same least squares regression technique on the values received from the second set of "B" Loran receiver data to calculate $T_{NBO}$ which represents the initial starting line of position (hyperbola) as determined from the "B" Loran receiver. Circuit 80 utilizes a least squares regression technique upon the same data as received by logic circuit 76 to calculate the value $T_{NA}$, which represents the slope at which the "A" Loran hyperbolae are crossed. Likewise circuit 82 performs a similar calculation for the "B" Loran readings. The midpoint time of the run is then calculated by a circuit 84 which takes the total time $t$ of the run, and divides it by "2".

A logic circuit 86 then multiplies the computed slope by the calculated midpoint time and adds this to the initially computed position to calculate a midpoint line of position $\tau_A$ in Loran time difference. Logic circuit 88 performs a similar calculation to obtain $\tau_B$ which is the midpoint line of position in Loran time differences as calculated from the "B" Loran data. A memory 90 has stored therein certain required constants: ($c$) the speed of light; ($a$) the radius of the earth; ($D_A$) the delay before retransmission used by the "A" Loran station; and ($D_B$) a similar delay for the "B" Loran station. These values are directed as inputs to logic circuit 92 which performs the indicated calculation to obtain $\eta_{AR}$ which physically represents the difference of the arc length from the master Loran station to the calculated midpoint and the arc length from the A slave station to the calculated midpoint (note that this is the equivalent in distance to a Loran time difference). A similar value $\eta_{BR}$ is calculated by logic circuit 94 for the "B" Loran readings.

It was mentioned previously that the disclosed embodiment operates by assuming a geographical position, calculating expected values of $\eta_A$ and $\eta_B$ for that position, and comparing them to the statistically determined $\eta_{AR}$ and $\eta_{BR}$. The two sets of values are then tested against an error tolerance, and an iterative technique is utilized to calculate the actual position. The latitude and longitude of the initial assumed geographical position are stored in a memory 96, and are passed by a gate 98, the function of which will be explained later, to a latch memory 100 which temporarily stores these values. For the initial iteration these values pass through a logic unit 102, the function of which will be described later, to a second logic circuit 104, wherein the sine and cosine of the latitude $\phi$ are calculated. A logic unit 106 receives inputs from a memory 107 on the longitudes and the sines and cosines of the latitudes of the Loran stations A, B and M. Logic circuit 106 also receives the current iteration of $\lambda$ and $\phi$ from logic unit 102 and proceeds to calculate the values shown, which are intermediate values utilized in later calculations. The results of unit 106 are passed to unit 108 which computes, by utilizing the law of cosines for spherical triangles, the cosines of the angular distances from the Loran transmitters A, B and M to the assumed position (cos $\theta_A$, cos $\theta_B$, cos $\theta_M$). Logic circuit 110 then calculates the angles of the cosines and determines the angular distances from the Loran transmitters A, B and M to the assumed position. These values are then passed on to logic circuits 112 and 114. Logic unit 112 calculates the difference $\eta_A$ between the angular distance (arc) from the Loran Master transmitter to the assumed position and the angular distance (arc) of the "A" Loran transmitter to the assumed position. A similar calculation is carried on by unit 114 for the "B" Loran transmitter to obtain $\eta_B$. These values are then compared in comparator circuits 116 and 118 against the similar values $\eta_{AR}$ and $\eta_{BR}$ previously derived.

The differences between the measured and assumed values ($d\eta_A$, $d\eta_B$) are then compared in comparator circuits 120 and 122 against an error tolerance (L), stored in memory 107. If either one of these comparisons is outside of the acceptable tolerance (L), it will trigger an OR gate 124 which produces an output disabling gate 98 to prevent it from passing the initially assumed geographical coordinates from memory 96. In the iterations, the geographical coordinates in latch memory 100 are incrementally changed, as will be described in more detail, until the iteration produces an acceptable value for $d\eta_A$ and $d\eta_B$.

Assume now that at least one of the comparisons in circuits 120 and 122 is not within the acceptable limit L. OR gate 124 then enables AND gates 126 and 128 to pass the values $d\eta_A$ and $d\eta_B$ to logic circuits 130 and 132. Logic units 130 and 132 also receive the partial derivatives of $\phi$ with respect to $\eta_A$ and $\phi$ with respect to $\eta_B$ ($\delta\phi/\delta\eta_A$ and $\delta\phi/\delta\eta_B$) and the partial derivatives of with respect to $_A$ and with respect to $\eta_B$ ($\delta\lambda/\delta\eta_A$ and $\delta\lambda/\delta\eta_B$). These partial derivatives are derived from the equations for the law of cosines for spherical triangles. Logic units 140, 142, 144, 146, 148 and 150 all utilize the inputs shown to calculate intermediate values used in the solution of the law of spherical triangles with these intermediate values being designated as $X_A$, $Y_A$, $X_B$, $Y_B$, $X_M$ and $Y_M$. The solution of the law of spherical triangles is continued in logic circuit 152 which calculates the sine of angles $\theta_A$, $\theta_B$ and $\theta_M$, which are the angular distances from Loran transmitters A, B and M to the position of the current iteration. The results of these calculations are combined with the previously mentioned intermediate values in logic circuits 154, 156, 158 and 160 resulting in further intermediate values A, B, C and D which are then combined in logic circuits 162, 164, 166, 168 and 170 to solve for the partial derivatives $\delta\phi/\delta\eta_A$, $\delta\phi/\delta\eta_B$, $\delta\lambda/\delta\eta_A$, $\delta\lambda/\delta\eta_B$. These partial derivatives are then utilized by logic units 130 and 132, along with $d\eta_A$ and $d\eta_B$, to calculate $d\phi$ and $d\lambda$ which are directed back to logic unit 102 to modify $\phi$ and $\lambda$ for the next iteration. These iterations are repeated until $d\eta_A$ and $d\eta_B$ are within an acceptable tolerance L.

If $d\eta_A$ and $d\eta_B$ had been within limits, two "zeros" would have been produced as outputs of comparator circuits 120 and 122 preventing OR gate 124 from triggering another iteration, instead producing a "1" output from a NAND gate 172. NAND gate 172 will in turn enable AND gates 174 to pass the values $\tau_A$, $\tau_B$ and the four partial derivatives $\delta\phi/\delta\eta_A$, $\delta\phi/\delta\eta_B$, $\delta\lambda/\delta\eta_A$, $\delta\lambda/\delta\eta_B$. Circuits 176 and 178 then introduce scaling factor corrections and calculate intermediate values for crossing velocities of the "A" Loran hyperbolae and "B" Loran hyperbolae $\eta_A$ and $\eta_B$. These outputs are then combined in circuits 180 and 182 to calculate the time derivatives of $\phi$ and $\lambda$($\phi$ and $\lambda$) which are relative to latitude and longitude. Circuit 184 then performs the indicated calculation according to the Pythagorean Theorem to determine the ship's speed over the earth's surface. This might be recorded as illustrated or might be divided by the factor 1852 to convert from meters per hour to knots.

Figure 6:
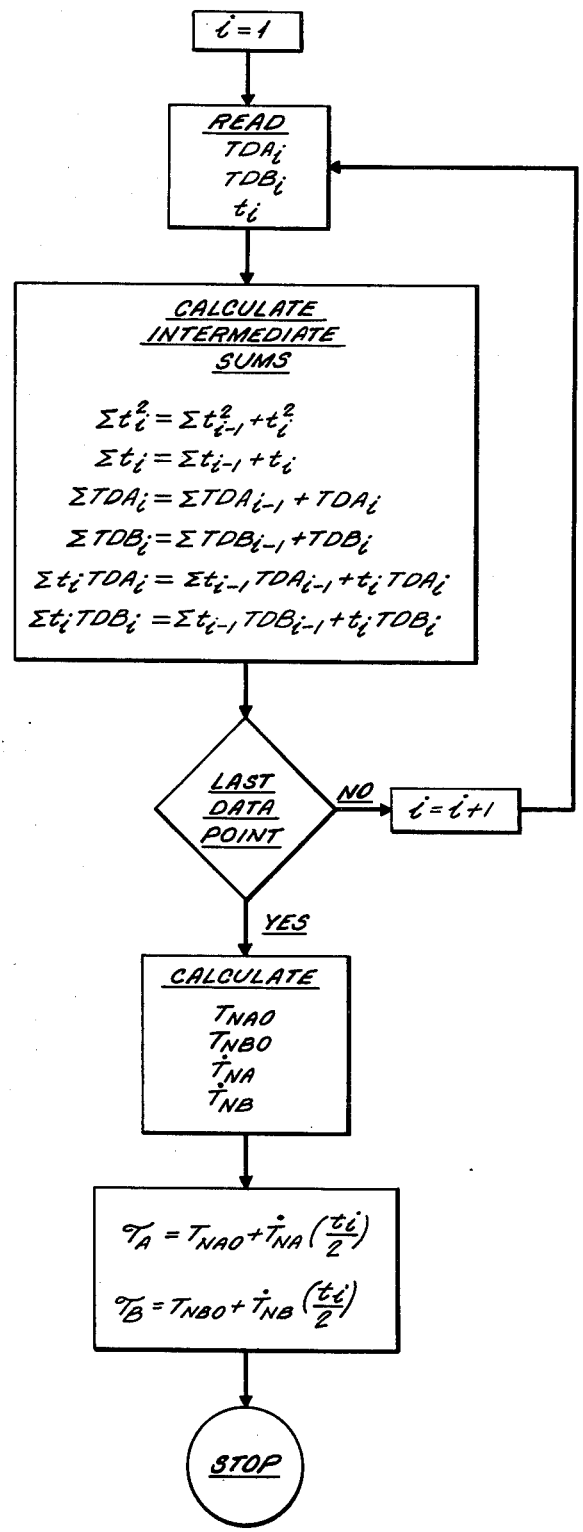
FIG. 6 illustrates a flow diagram of data for a computer approach to determine the ship's speed from measured Loran navigational signals.

FIGS. 2, 3, 4 and 5 illustrate a logic circuit for calculating speed over the earth's surface from Loran navigational signals. The physical significance of these calculations have been explained during the explanation of the circuit. The derivations of many of the logic operations have been omitted for clarity and also for brevity. An alternative approach to the hardware illustrated in FIGS. 2 through 5 would be a softwave approach, which in many instances might be preferable. FIG. 6 illustrates a data flow diagram for this approach. The calculations for the parameters would be the same as shown in FIGS. 2 through 5.

Although at least one embodiment of the present invention has been described, the teachings of this invention will suggest many other embodiments to those skilled in the art.

The invention claimed is:

1. In a system for enabling the performance of a ship on a test run to be analyzed and including a means for determining the speed of the ship propeller shaft, a means for determining the rotational torque on the ship propeller shaft, and means for receiving successive readings in time of Loran navigational signals, the improvement comprising means responsive to the successive readings in time of the received Loran navigational signals for determining the ship speed regardless of whether or not the ship is traveling substantially perpendicular to Loran lines of hyperbolae, said means for determining the ship speed including:
    a. means for storing expected values of a given physical parameter which is dependent upon Loran time difference readings at an assumed geographical location of the test run midpoint;
    b. means, responsive to the successive readings in time, for calculating measured values of said given physical parameter for the test run midpoint;
    c. means for comparing the expected values of said given physical parameter with the measured values of said given physical parameters to determine if they are not within given error tolerances; and
    d. means responsive to a determination that said values are not within said given error tolerances for iteratively correcting the assumed location and then determining new expected values of said given physical parameter for the next assumed location and repeating the comparison and iteration until the given error tolerances are met.

2. A system as set forth in claim 1 wherein said given physical parameter is the difference of an arc from the master Loran station to a test run midpoint and an arc from a slave Loran station to a test run midpoint.

3. In a system for enabling the performance of a ship on a test run to be analyzed and including a means for determining the speed of the ship propellor shaft, a means for determining the rotational torque on the ship propeller shaft, and means for receiving successive readings in time of Loran navigational signals, the improvement comprising means responsive to the successive readings in time of the received Loran navigational signals for determining the ship speed regardless of whether or not the ship is traveling substantially perpendicular to Loran lines of hyperbolae, said means for determining the ship speed including:
    a. means for calculating the ship speed by determining the rate at which Loran lines of hyperbolae of two Loran station pairs are crossed;
    b. means, utilizing said rates of crossing, for calculating the speed at which the ship crosses line of latitude and longitude;
    c. means, responsive to said last named means, for correcting for a difference in scale between the lines of latitude and lines of longitude; and
    d. means, responsive to said correcting means, for utilizing the Pythagorean Theorem to calculate the ship speed.

4. A system responsive to the successive readings in time received by a Loran receiver from first and second sets of Loran navigational stations, for determining the speed of the receiver which received the successive readings in time regardless of whether or not the receiver is traveling substantially perpendicular to Loran lines of hyperbolae and including:
    a. means for storing expected values of a given physical parameter which is dependent upon Loran time difference readings at an assumed geographical location;
    b. means, responsive to the successive readings in time, for calculating measured values of said given physical parameter;
    c. means for comparing the expected values of said given physical parameter with the measured values of said given physical parameter to determine if they are within given error tolerances; and
    d. means responsive to a determination that said values are not within said given error tolerances for iteratively correcting the assumed location and then determining new expected values of said given physical parameter for the next assumed location and repeating the comparison and iteration until the given error tolerances are met.

5. A system as set forth in claim 4 wherein said given physical parameter is the difference of an arc from the master Loran station to the assumed geographical location and an arc from a slave Loran station to the assumed geographical location.

6. A system, responsive to the successive readings in time received by a Loran receiver from first and second sets of Loran navigational stations, for determining the speed of the receiver which received the successive readings in time regardless of whether or not the receiver is traveling perpendicular to Loran lines of hyperbolae and including:
    a. means, responsive to the successive readings in time, for calculating the speed by determining the rate at which Loran lines of hyperbolae of two Loran station pairs are crossed;
    b. means, utilizing said rates of crossing, for calculating the speed of crossing of lines of latitude and longitude;
    c. means, responsive to said last named means, for correcting for a difference in scale between the lines of latitude and the lines of longitude; and
    d. means, responsive to said correcting means, for utilizing the Pythagorean Theorem to calculate the speed.

7. In apparatus for determining the speed of a ship during a run, a method comprising the following steps:
   a. taking a plurality of Loran time difference signals from two different sets of Loran master/slave stations over a period of time during the run;
   b. operating on the plurality of signals according to statistical techniques to minimize random errors in the plurality of readings;
   c. generating signals corresponding to expected values of a given physical parameter for an assumed geographical location of the run midpoint which is dependent upon Loran time difference readings expected at the assumed geographical location;
   d. utilizing the statistically treated Loran time difference signals to generate further signals corresponding to measured values of said given physical parameter for the midpoint of the run;
   e. comparing the signals corresponding to expected values of said given physical parameter with the signals corresponding to measured values of said given physical parameter to determine if they are within given error tolerances; and
   f. iteratively correcting the generated signals corresponding to expected values of the given physical parameter for an assumed geographical location until the error tolerances are met.

8. A method as set forth in claim 7 wherein said step of generating signals corresponding to expected values of a given physical parameter for an assumed geographic location includes the step of generating signals corresponding to expected values of the difference of an arc from a master Loran station to a run midpoint and an arc from a slave Loran station to a run midpoint.

9. A method as set forth in claim 8 and further including the steps of:
   a. generating signals corresponding to the rates at which Loran lines of hyperbolae of two Loran station pairs are crossed;
   b. utilizing said signals corresponding to the rates of crossing to generate further signals corresponding to the speeds at which the receiver crosses lines of latitude and longitude;
   c. adjusting said signals corresponding to the speeds at which the receiver crosses lines of latitude and longitude for a difference in scale between the lines of latitude and the lines of longitude; and
   d. applying the Pythagorean Theorem to said adjusted signals to generate a signal corresponding to the speed of the object.

10. A system for enabling the performance of a ship on a test run to be analyzed including: a means for determining the speed of the ship propeller shaft, a means for determining the rotational torque on the ship propeller shaft, a means for determining the flow of fuel consumed by the ship during the test run, a means for determining the temperature of the fuel consumed by the ship during the test run, a gyrocompass for measuring the heading of the ship, a means for receiving successive readings in time from first and second sets of Loran navigational signals, a means responsive to the successive readings in time for determining the ship speed regardless of whether or not the ship is traveling substantially perpendicular to Loran lines of hyperbolae, and printer means coupled to said means for determining the speed of the ship propeller shaft, to said means for determining the rotational torque on the propeller shaft to said means for determining the fuel temperature, to said means for determining the fuel flow, to said gyrocompass, and to said receiving means, whereby a fairly complete record of the test run may be maintained.

11. A system as set forth in claim 10 and wherein said means for determining the ship speeds includes: elapsed time means and computing means coupled to said elapsed time means and said receiving means for statistically processing the successive readings in time from the first and second sets of Loran navigational stations to eliminate the effects of random errors in the signals.

12. A system as set forth in claim 10 wherein said computing means includes means for employing a least squares regression technique upon the successive readings to eliminate the effects of random errors.

* * * * *